United States Patent
Bestgen et al.

(10) Patent No.: US 8,935,231 B2
(45) Date of Patent: Jan. 13, 2015

(54) OPTIMIZING A QUERY TO A PARTITIONED DATABASE TABLE USING A VIRTUAL MAINTAINED TEMPORARY INDEX THAT SPANS MULTIPLE DATABASE PARTITIONS

(75) Inventors: Robert Joseph Bestgen, Rochester, MN (US); Robert Victor Downer, Rochester, MN (US); Shantan Kethireddy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1752 days.

(21) Appl. No.: 12/120,582

(22) Filed: May 14, 2008

(65) Prior Publication Data

US 2008/0215540 A1    Sep. 4, 2008

Related U.S. Application Data

(63) Continuation of application No. 11/388,004, filed on Mar. 23, 2006, now abandoned.

(51) Int. Cl.
   *G06F 17/30* (2006.01)
(52) U.S. Cl.
   CPC ................. *G06F 17/30327* (2013.01)
   USPC .......................................... 707/713; 707/747
(58) Field of Classification Search
   USPC ............... 707/100–102, 705–710, 713, 747
   See application file for complete search history.

(56) References Cited

U.S. PATENT DOCUMENTS

| | | | |
|---|---|---|---|
| 6,289,334 B1 | 9/2001 | Reiner et al. | |
| 6,990,503 B1 | 1/2006 | Luo et al. | |
| 7,149,737 B1 | 12/2006 | Luo et al. | |
| 7,299,239 B1 | 11/2007 | Basu et al. | |
| 2003/0088579 A1* | 5/2003 | Brown et al. | 707/104.1 |
| 2004/0249845 A1 | 12/2004 | Das | |
| 2006/0010170 A1 | 1/2006 | Lashley et al. | |
| 2006/0136368 A1 | 6/2006 | Young-Lai et al. | |
| 2006/0206507 A1* | 9/2006 | Dahbour | 707/100 |
| 2007/0016588 A1 | 1/2007 | Bestgen et al. | |
| 2007/0250511 A1 | 10/2007 | Bestget et al. | |

OTHER PUBLICATIONS

S. Hong et al., "Efficient Execution of Range-Aggregate Queries," http://citeseer.ist.psu.edu/hongO1efficient.html.
A. Guttman, "R-trees: A Dynamic Index Structure for Spatial Searching," Proc. ACM SIGMOND Int. Conf. on Management of Data, http://citeseer.ist.psu.edu/context/46230/0.
A. Guttman, "A Dynamic Index Structure for Spatial Searching," http://portal.acm.org/citation.cfm?coll=GUIDE&dl=GUIDE&id=48790.
B. Yormark, "ACM SIGMOND Conference 1984: Boston, Massachusetts," http://www.informatik.uni-trier.de/%7Eley/db/conf/sigmod/sigmod84.html#Guttman84.

\* cited by examiner

*Primary Examiner* — Hosain Alam
*Assistant Examiner* — Navneet K Ahluwalia
(74) *Attorney, Agent, or Firm* — Martin & Associates, LLC; Derek P. Martin (57) ABSTRACT

A query optimizer optimizes a query to a partitioned database table by determining common characteristics of the partitions and generating a virtual maintained temporary index that spans multiple partitions. Using the virtual maintained temporary index allows the query optimizer to generate an access plan based on the virtual maintained temporary index, which relieves the optimizer from having to individually optimize access to each partition for partitions that share common characteristics.

9 Claims, 6 Drawing Sheets

SELECT * FROM P_TABLE WHERE COL1 > 0

OPTIMIZING A QUERY TO A PARTITIONED DATABASE TABLE USING A VIRTUAL MAINTAINED TEMPORARY INDEX THAT SPANS MULTIPLE DATABASE PARTITIONS

CROSS-REFERENCE TO PARENT APPLICATION

This patent application is a continuation of U.S. Ser. No. 11/388,004 filed on Sep. 23, 2006, which is incorporated herein by reference.

BACKGROUND OF THE INVENTION

1. Field of the Invention

This invention generally relates to database systems, and more specifically relates to an apparatus and method for optimizing database queries.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

Queries are typically optimized by generating an access plan that will speed their execution. The work required to generate an access plan is greatly increased for a query to a partitioned database table, where multiple partitions are defined that collectively make up the overall database table. Sometimes the increased work for optimizing a query to a partitioned database table negates the desired performance enhancement that drove the partitioning of the database in the first place. Without a way to improve the efficiency of queries to partitioned database tables, existing database systems will suffer from reduced performance when optimizing queries to partitioned database tables.

BRIEF SUMMARY OF THE INVENTION

According to the preferred embodiments, a query optimizer optimizes a query to a partitioned database table by determining common characteristics of the partitions and generating a virtual maintained temporary index that spans multiple partitions. Using the virtual maintained temporary index allows the query optimizer to generate an access plan based on the virtual maintained temporary index. This relieves the optimizer from having to individually optimize access to each partition for partitions that share common characteristics, or from optimizing the query using a common strategy for all of the partitions.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and.

DETAILED DESCRIPTION OF THE INVENTION

1.0 Overview

The present invention relates to optimizing database queries to partitioned database tables. For those not familiar with databases, queries, or partitioned database tables, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 3:
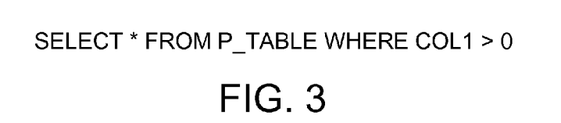
FIG. 3 is a sample query to the partitioned database table in FIG. 2.

One popular way to define a query uses Structured Query Language (SQL). SQL defines a syntax for generating and processing queries that is independent of the actual structure and format of the database. One sample SQL query is shown in FIG. 3. The "select *" statement tells the database query processor to select all columns, the "from P_Table" statement identifies which database table to search, and the "where" clause specifies one or more expressions that must be satisfied for a record to be retrieved. Note that the "where" clause of FIG. 3 specifies to return only those rows in P_TABLE that have a value greater than zero in the first column.

Known Query Optimizers

In the prior art, a tool known as a query optimizer evaluates expressions in a query. Indexes may be created and used in the access plan to speed the execution of a query. Some database systems allow storing the results of a query, and returning those results when the query is repeated. While this speeds up the execution of the query, the stored results may be stale due to changes in the database that were made since the last time the query was run. As a result, some applications require "live data", which means the database must be queried each time, thereby eliminating any performance improvement that might otherwise result from using previously-retrieved result sets. The use of indexes becomes even more important when live data is required.

Known Partitioned Database Tables

A partitioned database table is divided into multiple discrete portions referred to as partitions. Each entry in the table is allocated to a respective one of the partitions. A partition is usually a discrete data entry, such as a file, but contains the same definitional structure as all other partitions of the same table. Partitioning may be performed for a variety of reasons, and is usually performed on very large tables as a way to break the data into subsets of some conveniently workable size. By dividing a table into partitions, improved execution efficiency can result by working with a smaller subset of the table instead of the whole table.

The optimization of a query becomes more difficult when the query is to a partitioned database table in live data mode. A query optimizer typically analyzes and constructs an independent access plan for each partition, then performs a UNION operation on those respective access plans to produce an overall access plan for the query. For a partitioned table that includes six partitions, the query optimizer will separately optimize the access plan for each of the six partitions, even if the characteristics of the partitions are similar. The result is substantial overhead for the query optimizer in separately optimizing access to each partition, even when the characteristics of the partitions are similar. In fact, the overhead of constructing a separate and independent access plan for each partition can well outweigh the benefits of improved execution efficiency that results from having the multiple partitions in the first place. In the alternative, the query optimizer may optimize the partitions of the partitioned table as one entity, which means an access plan may work well for some partitions and poorly for others.

2.0 Detailed Description

A query optimizer generates an access plan for a query to a partitioned database table by determining common characteristics of the partitions and generating a virtual maintained temporary index that spans multiple partitions. Using the virtual maintained temporary index allows the query optimizer to generate an access plan based on the virtual maintained temporary index, which relieves the optimizer from having to individually optimize access to each partition for partitions that share common characteristics, and allows it to avoid grouping partitions better suited for indexing plans into non-indexed groups.

Figure 1:
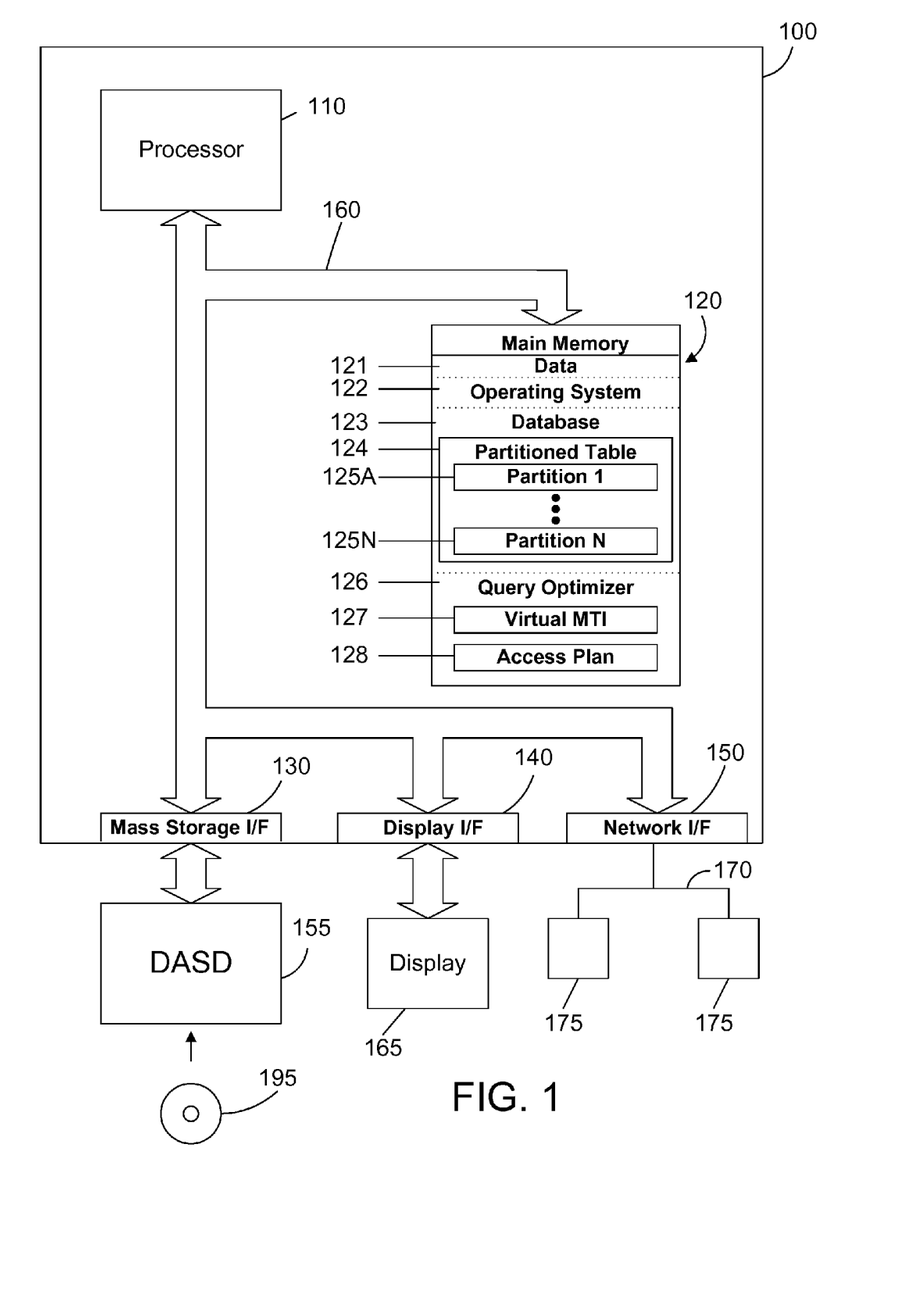
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, a database 123, and a query optimizer 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 is any suitable database that includes tables, whether currently known or developed in the future. Database 123 preferably includes a partitioned table 124 that is spread over multiple partitions, shown in FIG. 1 as partitions 125A, ..., 126N. The partitioned table 124 is preferably a prior art partitioned table, but could be any form of database table that is divided into separate portions. The query optimizer 126 is used to generate an access plan for a query to the database 123. The query optimizer 126, when processing a query to a partitioned table 124, determines common characteristics of the partitions, and generates a virtual maintained temporary index 127 that spans multiple partitions. The query optimizer then generates an access plan 128 for the query to the partitioned database table. The access plan 128 references the virtual maintained temporary index 127. By using a single virtual maintained temporary index 127 in generating an access plan for the query, the query optimizer is relieved of the work required to generate a separate access plan for all partitions in the partitioned table. Note that query optimizer 126 is shown separate from database 123, but could also be implemented in database 123 within the scope of the preferred embodiments.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, and query optimizer 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable media used to actually carry out the distribution. Examples of suitable computer-readable media include: recordable media such as floppy disks and CD-RW (e.g., 195 of FIG. 1), and transmission media such as digital and analog communications links.

Figure 2:
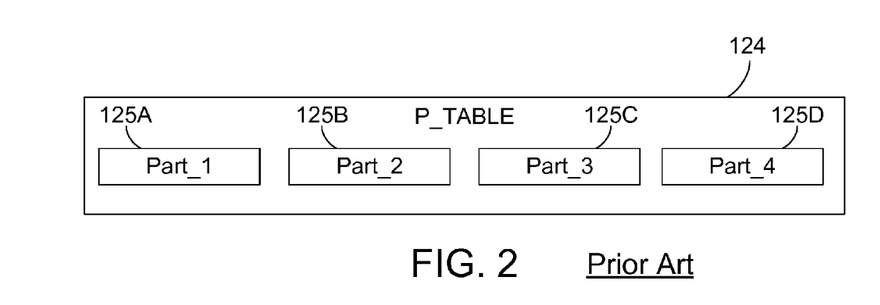
FIG. 2 is a block diagram of a sample partitioned database table as is known in the prior art.
Figure 4:
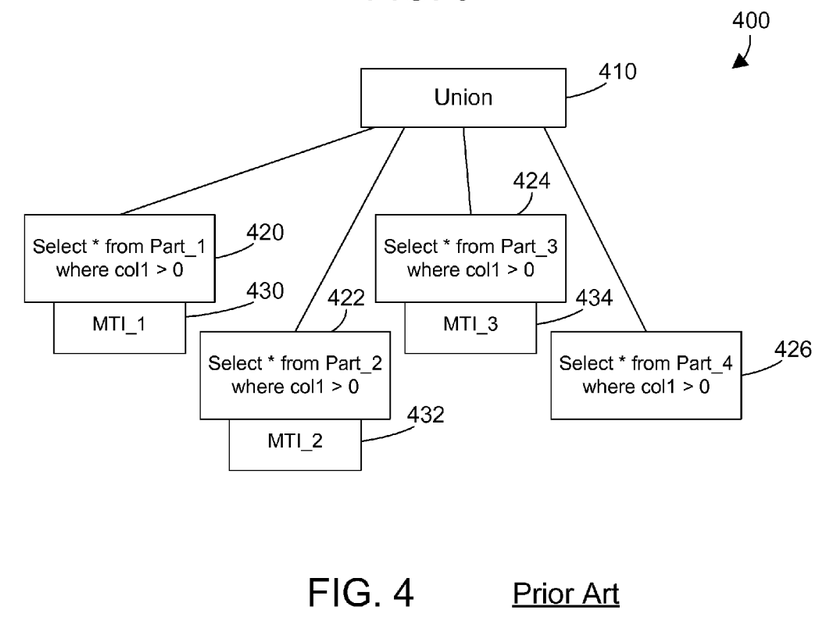
FIG. 4 is a block diagram showing how a prior art query optimizer performs a union of four separate access plans that correspond to the four partitions in the table of FIG. 2 to generate an overall access plan for the query of FIG. 3.
Figure 5:
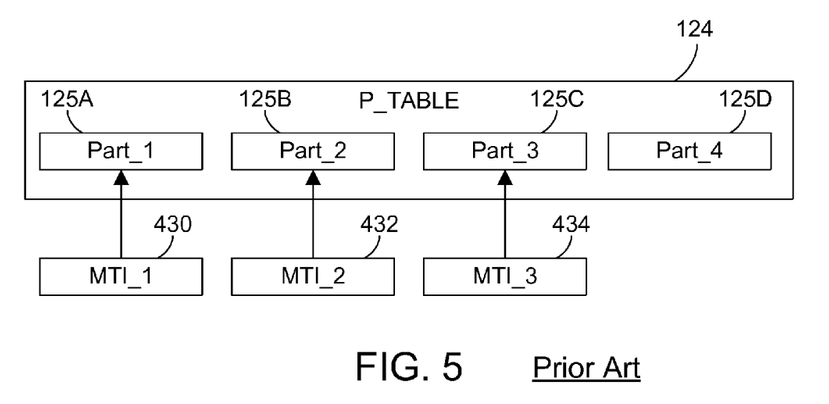
FIG. 5 is a block diagram that shows three separate and independent maintained temporary indexes for three of the four partitions in the partitioned database table in FIG. 2.

An example is now presented to illustrate how maintained temporary indexes were used in the prior art to provide a context for understanding the differences between the prior art and the preferred embodiments described herein. Referring to FIG. 2, we assume a prior art database table 124 P_TABLE is split into four partitions 125A, 125B, 125C and 125D. We also assume a query shown in FIG. 3 references the partitioned table P_TABLE. The query returns all records from P_TABLE that have a value in COL1 greater than zero. In the prior art, the query optimizer recognizes that each of the four partitions must be queried in live data mode (i.e., when cached result sets cannot be used). As a result, four separate queries to each of the four partitions are generated, and the results are joined via a UNION operation to generate an access plan 400. This access plan 400 is shown graphically as a query tree in FIG. 4. The first partition 125A is queried with a query 420; the second partition 125B is queried with a query 422; the third partition 125C is queried with a query 424; and the fourth partition is queries with a query 426. The results of these four separate sub-queries are then joined via a UNION 410. We assume for this example that live data is required, and that the characteristics of partitions 1, 2 and 3 (125A, 125B and 125C) are similar, and the speed of executing the sub-queries can be improved by using a maintained temporary index, as shown by MTI_1 430, MTI_2 432, and MTI_#434. These maintained temporary indexes are data structures associated with the different partitions, as shown in FIG. 5. We assume for this example that the fourth partition 125D has characteristics different than the other partitions, and the use of a maintained temporary index for the fourth partition 125D is unnecessary.

The disadvantage of the prior art query optimizer in live data mode is that each query to each partition is treated as a separate sub-query that must be separately optimized. Thus, in FIG. 4, each sub-query 420, 422, 4224 and 426 must be optimized. Note, however, that the characteristics of the first three partitions 125A, 125B and 125 C were assumed to be similar. If we assume the query optimizer optimizes the sub-queries 420, 422, 424 and 426 in order, the query optimizer first optimizes sub-queries 422. The query optimizer must then optimize the sub-query 422. Note, however, that the query is the same as the one just optimized, but to a different partition. But the query optimizer must separately optimize sub-query 422. The query optimizer must then optimize sub-query 424, which is the same as the two just optimized, but to a different partition. The query optimizer then optimizes sub-query 426. Note that the query optimizer must repeat the work to optimize the sub-queries 420, 422 and 424, even though the respective partitions have similar characteristics. This means that the prior art query optimizer must perform significant additional work when a query accesses a partitioned database table. The preferred embodiments presented herein provide efficiencies that reduce the work of optimizing a query to a partitioned database table.

Figure 6:
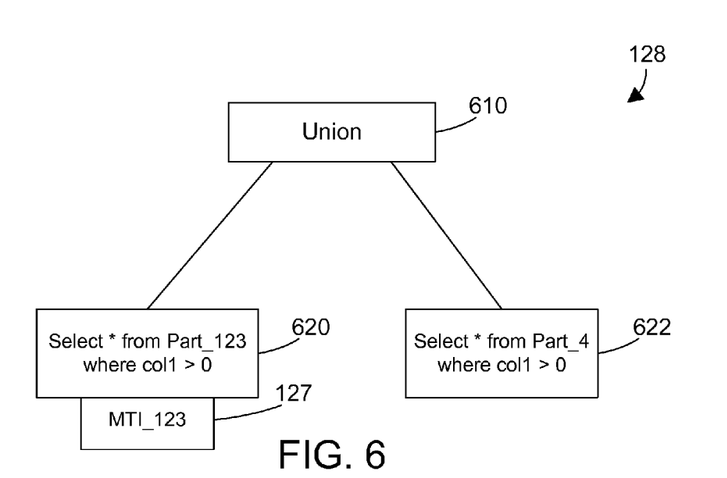
FIG. 6 is a block diagram showing the generation of a virtual maintained temporary index that spans multiple partitions in accordance with the preferred embodiments.

We now assume the same query in FIG. 3 references the same partitioned database table 124 in FIG. 2. A query tree that is built by a query optimizer in accordance with the preferred embodiments is shown in FIG. 6. Note that the number of sub-queries has been reduced from four in the prior art shown in FIG. 4 to two, namely sub-queries 620 and 622. The query optimizer first analyzes the partitions 125A-125D, and determines that partitions 125A, 125B and 125C have common characteristics. The query optimizer also determines that partition 125D has characteristics different from the other three partitions 125A-125C. The query optimizer then generates a sub-query 620 that covers all three partitions. Again, we assume live data is required. Because these three partitions 125A-125C share common characteristics, a single, virtual maintained temporary index 127 may be used for the sub-query 620 that references all three partitions 125A-125C. Because the fourth partition 125D does not share the common characteristics, a sub-query 622 must still be generated and optimized for the fourth partition. The sub-queries 620 and 622 are then joined with a UNION operation 610 to provide the overall access plan 128 for the query. Because the query optimizer must optimize only two sub-queries in the access plan 128 in accordance with the preferred embodiments, compared to optimizing four sub-queries in the prior art access plan 400 in FIG. 4, the work of the query optimizer is substantially reduced.

Figure 7:
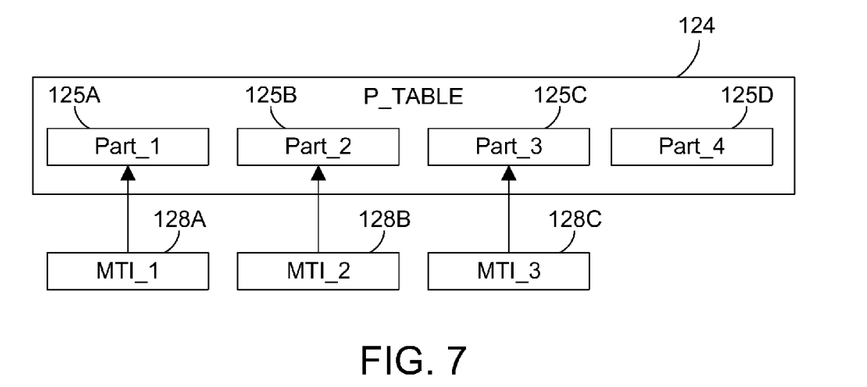
FIG. 7 is a block diagram showing a first way for the optimizer to process the VMTI shown in FIG. 6 by expanding the VMTI to corresponding individual MTIs over the individual partitions.
Figure 8:
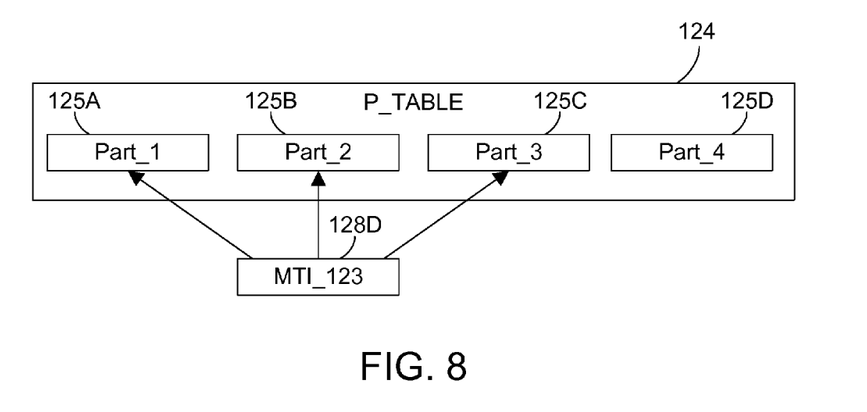
FIG. 8 is a block diagram showing a second way for the optimizer to process the VMTI shown in FIG. 6 by expanding the VMTI over three of the individual partitions.

One of the important features of the preferred embodiments is the ability to optimize a query to a partitioned database table when live data is required using a virtual maintained temporary index that spans multiple partitions. Once the partition is optimized, the back-end of the optimizer may actually implement the virtual maintained temporary index in different ways. For example, referring to FIG. 7, the virtual maintained temporary index 127 could be implemented in the optimizer back-end using three separate MTIs 128A, 128B and 128C. In the alternative, referring to FIG. 8, the virtual maintained temporary index 127 could be implemented in the optimizer back-end using a single MTI 128D that spans multiple partitions that have common characteristics. Whatever the back-end implementation of the virtual maintained temporary index, the query optimizer of the preferred embodiments greatly benefits from generating a single virtual MTI that spans multiple partitions that share common characteristics.

Note that the term "common characteristics" includes any suitable characteristic of a partition that can be measured and compared with any suitable characteristics of another partition. Suitable characteristics include: number of records, "last updated" timestamp, selectivity when a predicate is applied, etc. The preferred embodiments expressly extend to any suitable characteristics of a partition, and any suitable heuristic for comparing characteristics of different partitions to determine whether or not the partitions share common characteristics.

Figure 9:
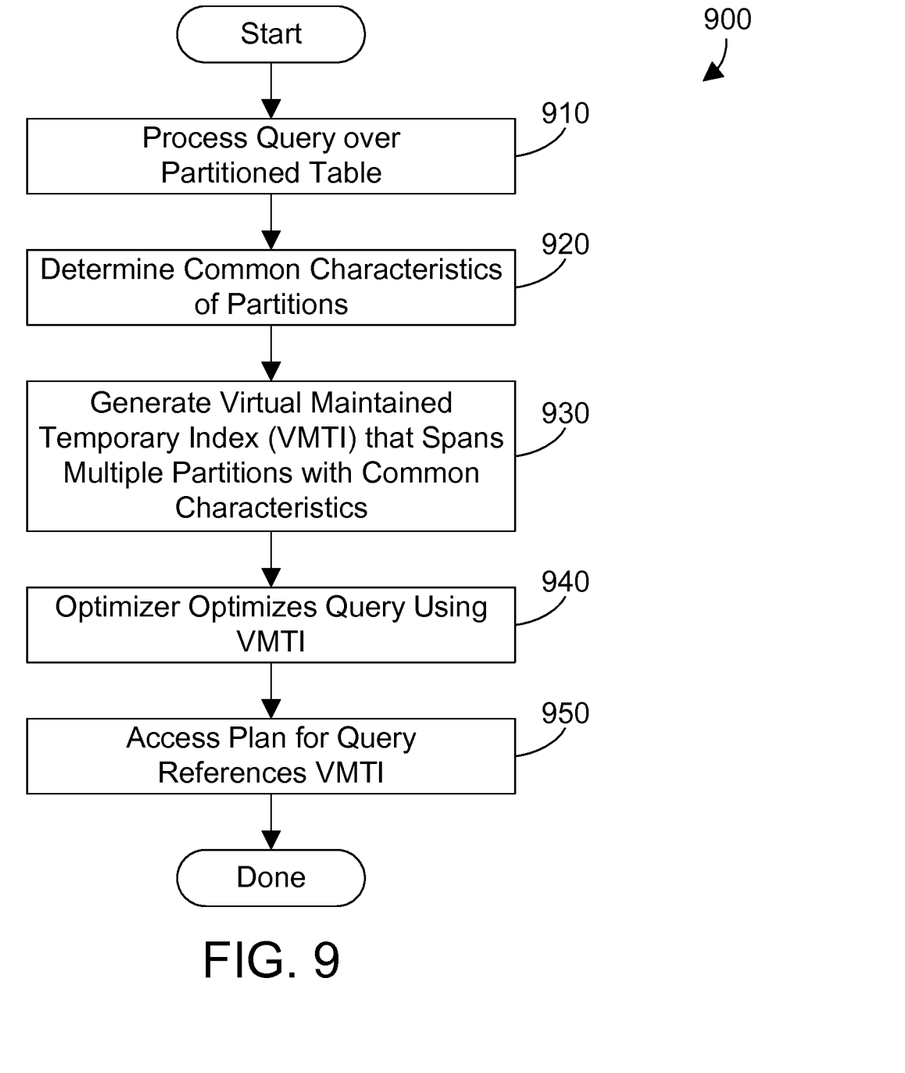
FIG. 9 is a flow diagram of a method for optimizing a database query to a partitioned table in accordance with the preferred embodiments.

Referring to FIG. 9, a method 900 in accordance with the preferred embodiments is preferably performed by the query optimizer 126 in FIG. 1. Method 900 begins by processing a query that references a partitioned database table (step 910). The query optimizer determines which partitions share common characteristics (step 920). The query optimizer then generates a virtual maintained temporary index (VMTI) that spans multiple partitions that share common characteristics (step 930). The optimizer then optimizes the query using the VMTI (step 940), resulting in an access plan that references the VMTI (step 950).

Figure 10:
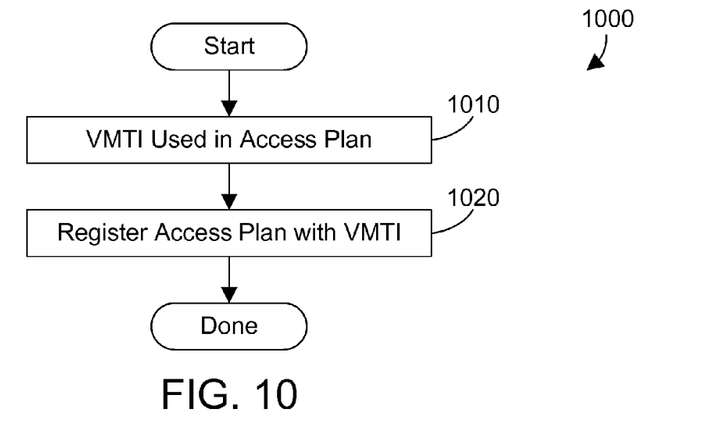
FIG. 10 is a flow diagram of a method for an access plan to register ownership of a VMTI.
Figure 11:
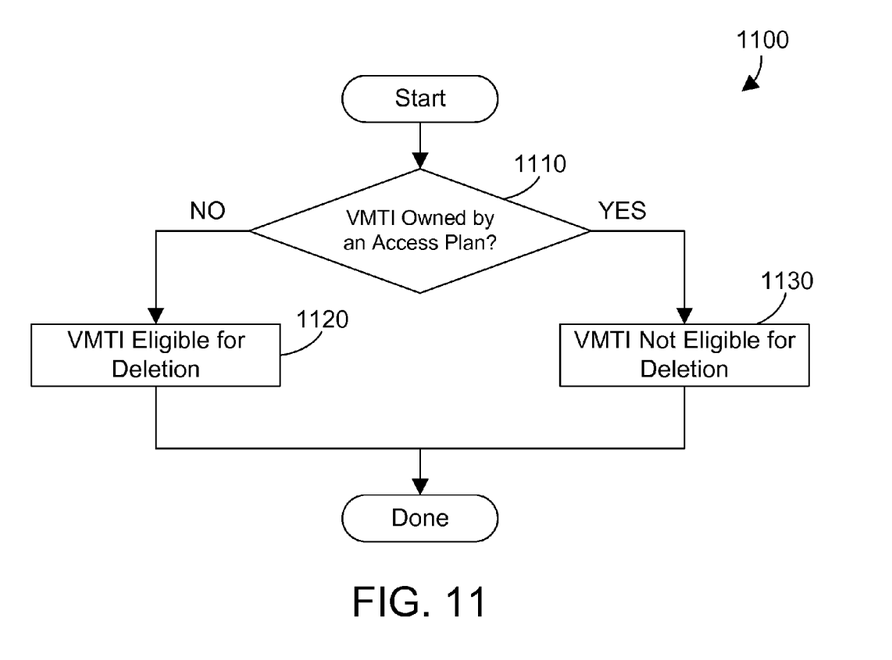
FIG. 11 is a flow diagram of a method for keeping temporary indexes ineligible for deletion as long as they are owned by an access plan.

One of the advantages of creating a VMTI is that, once created, the access plans for multiple queries may reference the VMTI. Referring to FIG. 10, a method 1000 in accordance with the preferred embodiments shows how an access plan registers ownership with a VMTI. When a VMTI is used in an access plan (step 1010), the Access Plan registers as an owner of the VMTI (step 1020). This "ownership" of a VMTI makes is much easier to determine when a VMTI should be deleted. Referring to FIG. 11, if a VMTI is owned by any access plan (step 1110=YES), the VMTI is not eligible for deletion (step 1130). Once the VMTI is not owned by any access plan (step 1110=NO), the VMTI is eligible for deletion (step 1120). By registering ownership of a VMTI, an access plan assures the VMTI will be available so long as the access plan is active. This assumes an access plan unregisters with the VMTI when the access plan becomes inactive.

The preferred embodiments simplify the work of a query processor by grouping partitions of a partitioned database table according to common characteristics, then creating a virtual maintained temporary index that spans multiple partitions. The virtual maintained temporary index is then referenced in the access plan, which allows the query optimizer to avoid the work of separately optimizing accesses to each of the multiple partitions that share the common characteristics. The result is improved performance for a query optimizer.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
   at least one processor;
   a memory coupled to the at least one processor; and
   a query optimizer residing in the memory and executed by the at least one processor, the query optimizer generating a virtual maintained temporary index that spans a plurality of partitions in a partitioned database table, wherein the query optimizer creates an access plan for a query that references the partitioned database table, wherein the access plan references the virtual maintained temporary index, wherein the query optimizer registers ownership of a virtual maintained temporary index by an access plan when the virtual maintained temporary index is referenced in the access plan, wherein the query optimizer disables deletion of the virtual maintained temporary index when the virtual maintained temporary index is owned by at least one access plan, wherein the query optimizer enables deletion of the virtual maintained temporary index when the virtual maintained temporary index is not owned by any access plan.

2. The apparatus of claim 1 wherein the query optimizer determines which of the plurality of partitions have common characteristics, wherein the virtual maintained temporary index spans a plurality of partitions that have common characteristics.

3. The apparatus of claim 2 wherein the virtual maintained temporary index comprises a plurality of maintained temporary indexes over the plurality of partitions that have common characteristics.

4. The apparatus of claim 2 wherein the virtual maintained temporary index comprises a single maintained temporary index over the plurality of partitions that have common characteristics.

5. A computer-readable program product comprising:
   a query optimizer that generates a virtual maintained temporary index that spans a plurality of partitions in a partitioned database table, wherein the query optimizer creates an access plan for a query that references the partitioned database table, wherein the access plan references the virtual maintained temporary index, wherein the query optimizer registers ownership of a virtual maintained temporary index by an access plan when the virtual maintained temporary index is referenced in the access plan, wherein the query optimizer disables deletion of the virtual maintained temporary index when the virtual maintained temporary index is owned by at least one access plan, wherein the query optimizer enables deletion of the virtual maintained temporary index when the virtual maintained temporary index is not owned by any access plan; and
   recordable media bearing the query optimizer.

6. The program product of claim 5 wherein the query optimizer determines which of the plurality of partitions have common characteristics, wherein the virtual maintained temporary index spans a plurality of partitions that have common characteristics.

7. The program product of claim 6 wherein the virtual maintained temporary index comprises a plurality of maintained temporary indexes over the plurality of partitions that have common characteristics.

8. The program product of claim 6 wherein the virtual maintained temporary index comprises a single maintained temporary index over the plurality of partitions that have common characteristics.

9. An apparatus comprising:
at least one processor;
a memory coupled to the at least one processor; and
a query optimizer residing in the memory and executed by the at least one processor, the query optimizer generating a virtual maintained temporary index that spans a plurality of partitions in a partitioned database table, wherein the query optimizer creates an access plan for a query that references the partitioned database table, wherein the access plan references the virtual maintained temporary index, wherein the query optimizer determines which of the plurality of partitions have common characteristics, wherein the virtual maintained temporary index spans a plurality of partitions that have common characteristics, wherein the virtual maintained temporary index comprises a plurality of maintained temporary indexes over the plurality of partitions that have common characteristics, wherein the query optimizer registers ownership of a virtual maintained temporary index by an access plan when the virtual maintained temporary index is referenced in the access plan, wherein the query optimizer disables deletion of the virtual maintained temporary index when the virtual maintained temporary index is owned by at least one access plan, wherein the query optimizer enables deletion of the virtual maintained temporary index when the virtual maintained temporary index is not owned by any access plan.

* * * * *